(12) United States Patent
Fujioka et al.

(10) Patent No.: US 7,037,162 B2
(45) Date of Patent: May 2, 2006

(54) OPTICAL FIBER CODE HOLDING STRUCTURE IN WHICH THE NUMBER OF THE PARTS FOR THE FUNCTION OF PROTECTING THE LIGHT FROM BEING DIRECTLY VIEWED AND THE FUNCTION OF HOLDING THE OPTICAL FIBER CODE IS REDUCED AND THE CONNECTING WORK OF AN OPTICAL CONNECTOR IS EASILY PERFORMED

(75) Inventors: Shintaro Fujioka, Tokyo (JP); Hiroshi Ootani, Tokyo (JP); Yoshinori Nakamura, Miyagi (JP); Hisakazu Meguro, Miyagi (JP)

(73) Assignee: NEC Corporation, Tokyo (JP)

( * ) Notice: Subject to any disclaimer, the term of this patent is extended or adjusted under 35 U.S.C. 154(b) by 218 days.

(21) Appl. No.: 10/156,006

(22) Filed: May 29, 2002

(65) Prior Publication Data

US 2002/0181884 A1 Dec. 5, 2002

(30) Foreign Application Priority Data

May 31, 2001 (JP) .................................. 2001-165567

(51) Int. Cl.
*H01J 9/06* (2006.01)
*H01J 9/10* (2006.01)
*H01J 9/16* (2006.01)
*H01J 9/46* (2006.01)
*H05B 33/10* (2006.01)

(52) U.S. Cl. ............................... 445/62; 445/5; 445/6; 445/63

(58) Field of Classification Search ................. 385/31, 385/34, 115, 116, 120, 136–139; 445/5, 6, 445/62, 63
See application file for complete search history.

(56) References Cited

U.S. PATENT DOCUMENTS

| 5,179,617 | A | * | 1/1993 | Stockman | 385/136 |
|---|---|---|---|---|---|
| 5,230,032 | A | * | 7/1993 | Muzslay | 385/66 |
| 5,708,742 | A | * | 1/1998 | Beun et al. | 385/53 |
| 5,949,946 | A | * | 9/1999 | Debortoli et al. | 385/134 |
| 6,375,363 | B1 | * | 4/2002 | Harrison et al. | 385/77 |
| 6,447,170 | B1 | * | 9/2002 | Takahashi et al. | 385/53 |
| 6,601,995 | B1 | * | 8/2003 | Harrison et al. | 385/77 |
| 6,612,750 | B1 | * | 9/2003 | Bull et al. | 385/65 |

FOREIGN PATENT DOCUMENTS

| JP | 56-108115 | | 1/1955 |
|---|---|---|---|
| JP | 62-245207 | A | 10/1987 |
| JP | 63-100707 | U | 6/1988 |
| JP | H4-48503 | U | 4/1992 |
| JP | H8-240725 | A | 9/1996 |
| JP | 2576978 | Y2 | 5/1998 |
| JP | H11-64647 | A | 3/1999 |

* cited by examiner

*Primary Examiner*—Joseph Williams
*Assistant Examiner*—Dalei Dong
(74) *Attorney, Agent, or Firm*—Sughrue Mion, PLLC

(57) ABSTRACT

An optical fiber code holding structure, includes: an optical adapter and an optical fiber code holding member. An optical connector of an optical fiber is connected to an optical adapter. The optical connector is attached to an end of an optical fiber code of the optical fiber. The optical fiber code holding member has a light shielding device shielding lights emitted from the optical adapter and a holding device holding the optical fiber code.

28 Claims, 7 Drawing Sheets

OPTICAL FIBER CODE HOLDING STRUCTURE IN WHICH THE NUMBER OF THE PARTS FOR THE FUNCTION OF PROTECTING THE LIGHT FROM BEING DIRECTLY VIEWED AND THE FUNCTION OF HOLDING THE OPTICAL FIBER CODE IS REDUCED AND THE CONNECTING WORK OF AN OPTICAL CONNECTOR IS EASILY PERFORMED

BACKGROUND OF THE INVENTION

1. Field of the Invention

The present invention relates to an optical fiber code holding structure and an optical fiber code holding member. More particularly, the present invention relates to an optical fiber code holding structure and an optical fiber code holding member for shielding lights emitted from an optical adapter and thereby protecting the emitted lights from being directly viewed.

2. Description of the Related Art

Conventionally, the structure of holding an optical fiber code connected to an optical adapter uses a wire saddle as a member for holding the optical fiber code. This wire saddle is designed so as to have only a function of holding the optical fiber code.

(Conventional Example)

The conventional typical optical fiber code holding structure will be described below with reference to the drawing.

FIG. 1 is a schematic perspective view illustrating the conventional typical optical fiber code holding structure.

In FIG. 1, a conventional optical fiber code holding structure 100 is provided with: an optical fiber 2 in which an optical connector 22 is attached to an end of an optical fiber code 21; an optical adapter 3 which is placed on a body 5, such as an optical communicating apparatus or the like, and to which the optical connector 22 is connected; and a wire saddle 104, which is similarly placed on the body 5, for holding the optical fiber code 21 of the connected optical fiber 2.

Here, in the optical adapter 3, a connection hole (not shown) to which the optical connector 22 is connected is formed on the end plane of a lower portion, and the lights are inputted and outputted through the connection hole.

Also, an optical adapter 3 is protuberantly placed such that the optical axis of the input/output lights is oriented in a downward oblique direction.

Due to such configuration, when the output lights are emitted from the optical adapter 3 on the output side, even if a worker or the like detaches the optical connector 22 from the optical adapter 3, the output lights are emitted in the downward oblique direction, which can reduce the risk that the output lights are directly viewed.

When the light having a high energy density is used such as a laser light and the like, a light shutter 105 is installed in the optical adapter 3.

This light shutter 105 has the shape of a flat plate that is bent in the shape of a key when it is viewed from the side, and it is rotatably installed on the lower portion of the front plane of the optical adapter 3. Also, the light shutter 105 is pushed by a spring or the like so that it covers the connection hole when the optical connector 22 is not connected.

Thus, when connecting the optical connector 22 to the optical adapter 3, the worker or the like firstly opens the light shutter 105 in the downward direction, and then inserts the optical connector 22 into the connection hole.

Also, when the optical connector 22 is detached from the optical adapter 3, the worker or the like removes the optical connector 22 from the connection hole without operating the light shutter 105. In short, this structure is designed such that after the optical connector 22 is detached from the connection hole, the pushed light shutter 105 automatically clogs the connection hole, and the output lights are not emitted from the connection hole to external space.

The wire saddle 104 has an opening 123 on the front surface thereof, and it is rectangular and annular.

Here, an open width of the opening 123 is designed to be approximately equal to a diameter of the optical fiber code 21.

Due to such configuration, when the optical fiber code 21 is inserted into the annular inner portion from the opening 123 of the wire saddle 104, the optical fiber code 21 is not easily removed from the opening 123. Accordingly, the wire saddle 104 can hold the optical fiber code 21 in the range of the annular inner portion.

However, the conventional optical fiber code holding structure 100 is designed so as to attain only the function of holding the optical fiber code. Thus, this configuration disables the drop in the number of the parts of the light shutter 105 (including a rotational shaft, a bearing and a pusher), from the viewpoint of the inclusion of the function of protecting the light from being directly viewed. This results in a problem that the manufacturing cost can not be entirely reduced.

By the way, the rotational shaft, the bearing and the pusher of the light shutter 105 are complex in shape, and they are machined at high accuracies. Thus, they are the expensive parts.

The conventional technique of using the light shutter 105 has a problem that the worker or the like must carefully carry out the operation for opening the light shutter 105 and then inserting the optical connector 22 into the connection hole when connecting the optical connector 22 to the optical adapter 3.

In short, the worker or the like brings the optical connector 22 near the connection hole of the optical adapter 3 while gradually opening the light shutter 105 so that the output lights emitted from the connection hole are emitted to the light shutter 105 and the optical connector 22. That is, they are not emitted to the external space except the light shutter 105 and the optical connector 22.

Japanese Utility Model Publication No. 2576978 discloses the following laser light shielding device. This is the laser light shielding device constituted by the combination of a plug, a cylinder and a guard. Its feature is as follows. That is, the plug made of the material for shielding the laser light is inserted into an optical connector terminal hole of an optical connector so as to shield the laser lights from the optical connector and further clog the optical connector terminal hole. The cylinder integrated with the plug is designed so as to receive the tip of a connecter with an optical code, which is connected to the optical connector, as a protective cap, and then cover the connector tip. The guard formed in the coupling portion of the plug and the cylinder determines the position of the plug inserted into the optical connector terminal hole of the optical connector. The plug and the cylinder are integrally linked in the condition that their orientations are opposite to each other. The plug is inserted into the optical connector terminal hole and mounted in the optical connector. Also, the cylinder holds the connector with the optical code, correspondingly to the position of the optical connector terminal hole.

Japanese Utility Model Laid Open Application Showa 56-108115 discloses the following mechanism for protecting a laser hazard. Its feature lies in that an optical switch unit formed in an optically connecting device is provided with: a mount surface having an optical connector on a fixed side, from which laser lights from a laser light source are emitted; a leg protruding from the mount surface to a substantially vertical and upward direction; a bent portion made of an elastic member which is bent downwardly from the upper end of the leg; and a flat plane for shielding the laser lights from the optical connector on the fixed side, in association with the recovery of the bent portion caused by the separation of an optical connector on an outer side connected to the optical connector on the fixed side, oppositely to the mount surface in the end of the bent portion.

Japanese Utility Model Laid Open Application Showa 63-100707 discloses the following mechanism for protecting a laser hazard. Its feature lies in that on an open shaft of an optical connector on a fixed side, it is provided with: a first shielding plate for shielding laser lights emitted from the connector on the fixed side and determining the position during notching an optical fiber of an optical connector on a detached side which is connected to the optical connector on the fixed side; and a second shielding plate for reclining the optical fiber against the shaft to curve it to a predetermined shape.

Japanese Laid Open Patent Application (JP-A-Showa 62-245207) discloses the following mechanism for protecting a laser hazard. Its feature lies in that a shielding body for shielding laser lights is formed at an interval in which an optical connector on an attached side can be attached and detached, in a travel direction of the laser lights in which the laser lights are emitted towards space from an optical connector on a fixed side, in the condition where the optical connector on the attached side that is attached to the optical connector on the fixed side is detached.

SUMMARY OF THE INVENTION

The present invention is accomplished in view of the above mentioned problems of the conventional techniques. Therefore, an object of the present invention is to provide an optical fiber code holding structure and an optical fiber code holding member, in which a function of protecting a light from being directly viewed is added to an optical fiber code holding member to thereby reduce the number of the parts necessary for the function of protecting the light from being directly viewed and the function of holding the optical fiber code, and the structure can be simplified to thereby improve the economical efficiency and easily carry out the connecting work of an optical connector.

In order to achieve an aspect of the present invention, an optical fiber code holding structure, includes: an optical adapter to which an optical connector of an optical fiber is connected, the optical connector being attached to an end of an optical fiber code of the optical fiber; and an optical fiber code holding member, and wherein the optical fiber code holding member has a light shielding device shielding lights emitted from the optical adapter and a holding device holding the optical fiber code.

In this case, the optical fiber code holding member has a shape of a flat plate, and the light shielding device and the holding device are integrated into a single structure.

Also in this case, a flat portion of the flat plate is used as the light shielding device.

Further in this case, the light shielding device is rotatable.

In this case, the flat portion of the light shielding device is vertical to an optical axis of the optical adapter.

Also in this case, the flat portion of the light shielding device is vertical to an optical axis of the optical adapter such that an output lights emitted from the optical adapter are reflected towards a connection hole of the optical adapter not to be reflected to an external space other than a space sandwiched between the connection hole and the light shielding device.

Further in this case, a distance from the optical adapter to the light shielding device is 5 to 20 cm.

In this case, the light shielding device diffusedly reflects the lights emitted from the optical adapter.

Also in this case, the holding device includes: a penetration hole larger than a sectional shape of the optical fiber code; and an opening through which the optical fiber code is inserted into the penetration hole.

Further in this case, the opening is formed to avoid the inserted optical fiber code from being easily disconnected.

In this case, the holding device is notched to hold the optical fiber code.

Also in this case, the optical fiber code holding structure includes a plurality of the holding devices.

Further in this case, the holding device is made of elastic material.

In order to achieve another aspect of the present invention, an optical fiber code holding member, includes: a holding device holding an optical fiber code connected to an optical adapter; and a light shielding device shielding lights emitted from the optical adapter.

In order to attain the above-mentioned object, the optical fiber code holding structure according to the present invention is provided with: an optical fiber in which an optical connector is attached to an end of an optical fiber code; an optical adapter to which the optical connector is connected; a light shielding device for shielding lights emitted from the optical adapter; and an optical fiber code holding member having a holder for holding the optical fiber code.

Such configuration enables the light shielding device of the optical fiber code holding member to shield the lights emitted from the optical adapter. Thus, it is not necessary to install the light shutter used in the conventional technique. Hence, the number of the parts necessary for the function of protecting the light from being directly viewed and the function of holding the optical fiber code can be reduced to thereby improve the economical efficiency.

Also, the optical fiber code holding structure is configured such that the optical fiber code holding member has the shape of a flat plate, and the light shielding device and the holder are integrated into a single structure.

Such configuration enables the portion of the flat plate to be used as the light shielding device. Thus, the structure of the parts necessary for the function of protecting the light from being directly viewed and the function of holding the optical fiber code can be simplified to thereby improve the economical efficiency. Typically, the execution of the connecting work of the optical connector does not require the rotation of the light shielding device. Hence, it is possible to easily carry out the connecting work of the optical connector.

Also, the optical fiber code holding structure is configured such that the light shielding device is rotated. Such configuration enables the optical fiber code holding member to be installed near the connection hole of a connected connector. Thus, it is possible to shorten the distance at which the output lights are emitted to the external space.

Also, the optical fiber code holding structure is configured such that the light shielding device is flat and the light shielding device is vertical to the optical axis of the optical adapter.

Such configuration causes the output lights emitted from the optical adapter to be reflected towards the connection hole of the optical adapter. That is, the reflection lights are not reflected to the external space except the space sandwiched between the connection hole and the light shielding device. Thus, it is possible to eliminate the risk that the light having the high energy density is directly viewed.

Also, the optical fiber code holding structure is configured such that the distance from the optical adapter to the light shielding device is 5 to 20 cm.

Such configuration enables the optical connector to be easily inserted into the optical adapter. Moreover, it is possible to effectively protect the output lights emitted from the optical adapter and the reflection lights from the light shielding device from being directly viewed. In short, since the distance from the optical adapter to the light shielding device is set to be equal to or longer than 5 cm, the optical connector can be easily inserted into the optical adapter. Also, since the distance is set to be equal to or shorter than 20 cm, it is possible to reduce the risk that the lights emitted from the optical adapter from being directly viewed.

Also, the optical fiber code holding structure is configured such that the light shielding device diffusedly reflects the emitted lights.

Such configuration causes the output lights emitted from the optical adapter to be diffusedly reflected, which brings about the drop in the energy density. Thus, even if the reflection light is inputted to an eye, it is possible to eliminate the risk of the damage to the eye.

Also, in the optical fiber code holding structure, the holder is provided with: a penetration hole larger than the sectional shape of the optical fiber code; and an opening, through which the optical fiber code is inserted into the penetration hole from the side direction of the optical fiber code, for avoiding the inserted optical fiber code from being easily disconnected.

Such configuration enables the optical fiber code to be inserted into the opening from the side direction, and thereby enables the optical fiber code to be easily held. Moreover, the held optical fiber code does not receive the pushed pressure from the side of the penetration hole. Thus, it is possible to protect the optical fiber code from being deformed or damaged.

Also, the optical fiber code holding structure is configured such that the holder is notched so as to hold the optical fiber code with it between.

Such configuration enables the shape of the holder to be simple. Thus, the manufacturing cost of the optical fiber code holding member can be reduced.

Also, the optical fiber code holding structure is configured such that the holders are formed at a plurality of position.

Such configuration enables the optical fiber code to be effectively held even if there are a plurality of optical fiber codes to be held or if there are a plurality of positions at which they are held.

Also, the optical fiber code holding structure is configured such that the holder is made of elastic material.

Such configuration can reduce the risk of the damage to the optical fiber code even if the optical fiber code held in the holder comes into contact with the holder.

Also, the present invention is effective as the optical fiber code holding member. The optical fiber code holding member according to the present invention is the optical fiber code holding member for holding the optical fiber code connected to the optical adapter, and it is provided with: the light shielding device for shielding the lights emitted from the optical adapter; and the holder for holding the optical fiber code.

Due to such configuration, the optical fiber code holding member can have the function of protecting the light from being directly viewed and the function of holding the optical fiber code. Thus, it is possible to increase the addition value of the optical fiber code holding member.

DESCRIPTION OF THE PREFERRED EMBODIMENTS

Embodiments of an optical fiber code holding structure according to the present invention will be described below with reference to the drawings.

At first, a first embodiment of an optical fiber code holding structure according to the present invention is described with reference to FIGS. 2, 3.

[First Embodiment of Optical Fiber Code Holding Structure]

Figure 1:
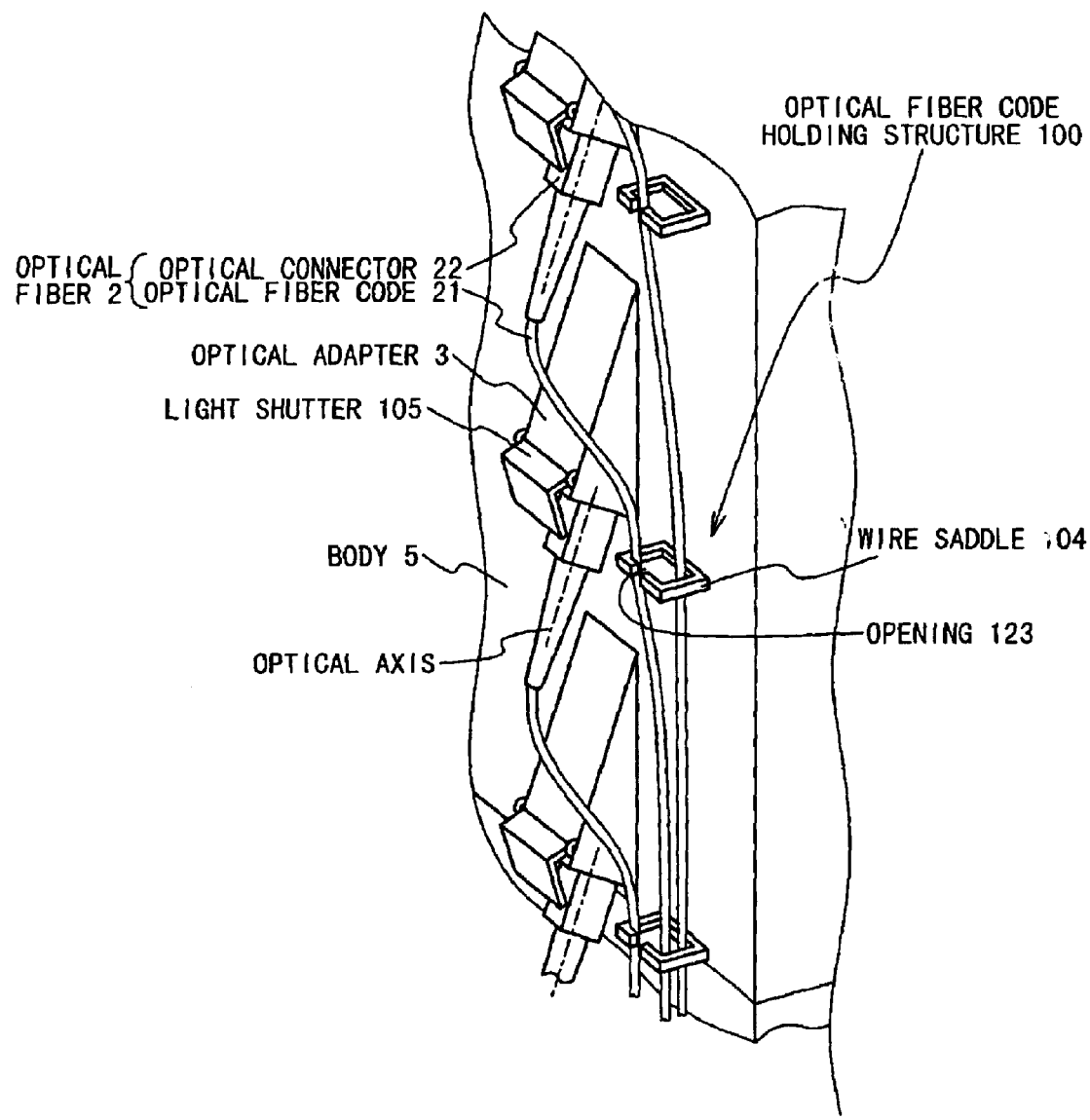
FIG. 1 shows a schematic perspective view illustrating an optical fiber code holding structure in a conventional example.
Figure 2:
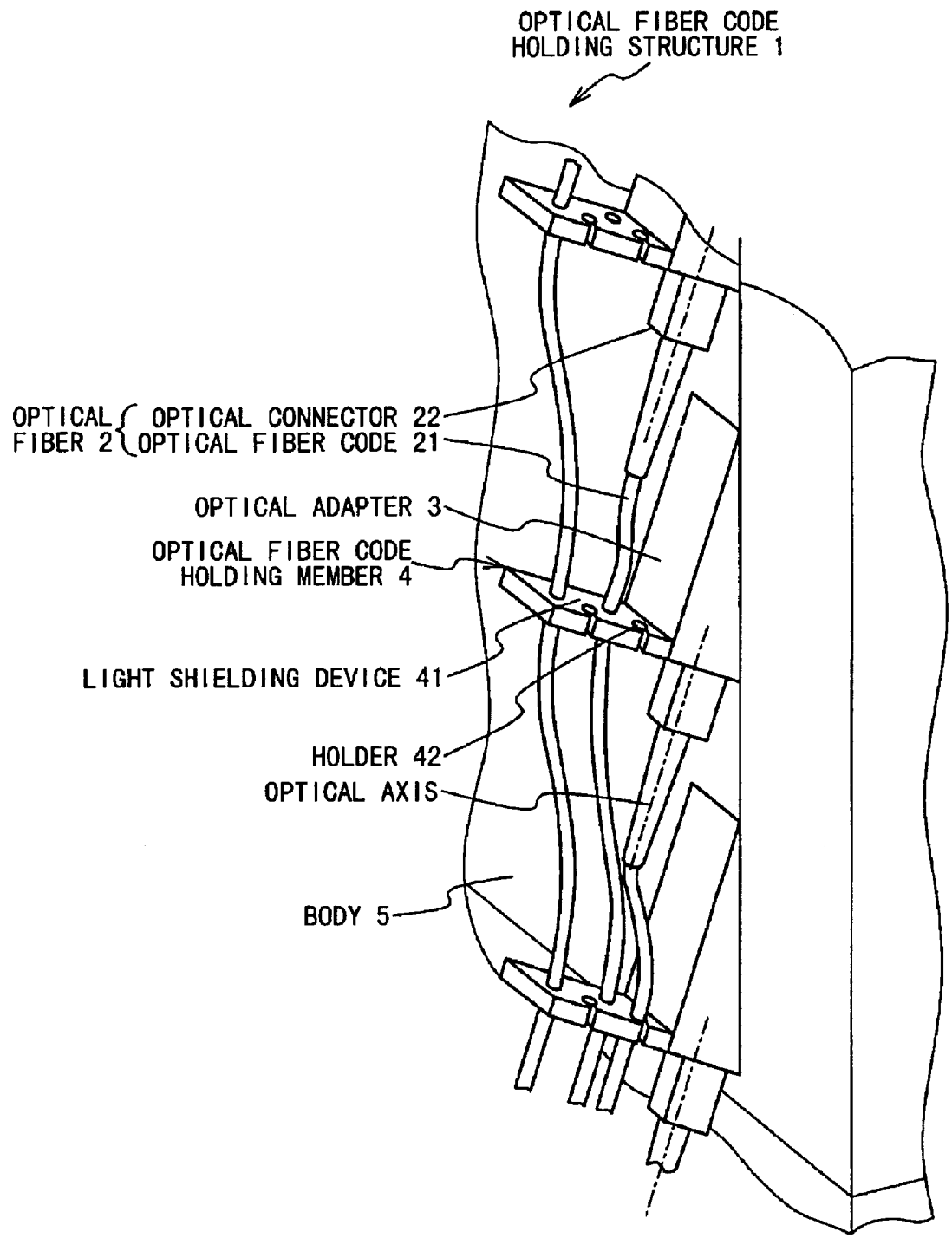
FIG. 2 shows a schematic perspective view illustrating a first embodiment of an optical fiber code holding structure according to the present invention.
Figure 3:
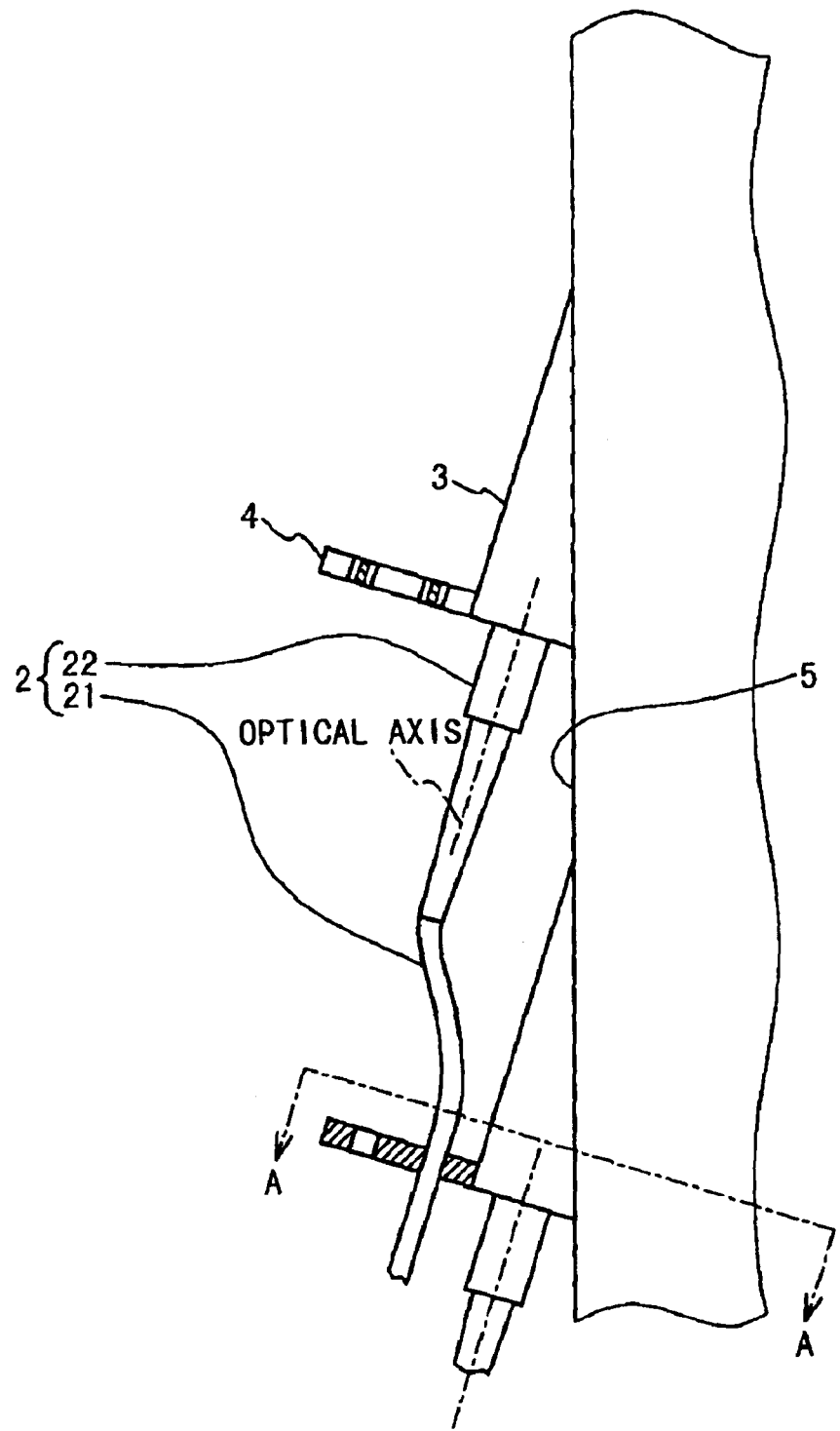
FIG. 3 shows a schematic side view illustrating a first embodiment of an optical fiber code holding structure according to the present invention.

FIG. 2 shows a schematic perspective view illustrating the first embodiment of the optical fiber code holding structure according to the present invention, and FIG. 3 shows a schematic side view illustrating the optical fiber code holding structure according to this embodiment.

By the way, in FIG. 3, a part of an optical fiber code 21 is omitted and illustrated for the purpose of easy understanding.

As shown in FIGS. 2, 3, an optical fiber code holding structure 1 in this embodiment is provided with: optical fibers 2 in which optical connectors 22 are attached to ends of the optical fiber codes 21; optical adapters 3 to which the optical connectors 22 are connected; light shielding devices 41 for shielding output lights emitted from the optical adapters 3; and an optical fiber code holding member 4 having a holder 42 for holding the optical fiber code.

Here, the optical adapters 3 are arrayed in a direction vertical to a side of a body 5, and the optical connector 22 is inserted into each of connection holes (not shown).

Also, the optical adapter 3 is protuberantly placed such that the optical axis is oriented in a downward oblique direction. Moreover, the connected connector 3 is not limited to the case that it is placed on the body 5.

Incidentally, the optical adapter 3 typical has the connected connector on an IN side (the side to which the light is inputted) and the connected connector on an OUT side (from which the light is outputted). The light having a high energy density (output light) is emitted from the connection hole of the connected connector on the OUT side.

By the way, the connected connector 3 shown in FIG. 2 is illustrated as the connected connector on the OUT side. However, it is natural that the optical fiber code holding member 4 may be attached to the connected connector on the IN side.

Thus, it is necessary to shield the output lights emitted to the external space, in such a way that the output lights emitted towards the external space from the connection hole of the connected connector 3 are not directly viewed when a worker or the like disconnects the optical connector 22 from the connected connector 3 or in other cases.

So, the optical fiber code holding structure 1 in this embodiment is configured such that the optical fiber code holding member 4 having the function of holding the optical fiber code and the function of protecting the light from being directly viewed is placed instead of the wire saddle 104 having only the function of holding the optical fiber code.

In short, the optical fiber code holding member 4 has the light shielding device 41 for shielding the lights from the connection hole of the optical adapter 3 and the holder 42 for holding the optical fiber code 21.

Here, the optical fiber code holding structure 1 may be configured such that the optical fiber code holding member 4 has the shape of a flat plate, and the light shielding device 41 and the holder 42 are integrated into the single structure.

Such configuration enables the portion of the flat plate to be used as the light shielding device 41. Thus, the structure of the optical fiber code holding member 4 can be simplified to thereby drop the number of the parts necessary for the function of protecting the light from being directed and the function of holding the optical fiber code. Thus, it is possible to entirely drop the manufacturing cost.

By the way, as compared with the above-mentioned conventional technique, for example, the shaft and the bearing to rotate the optical shutter 105 and the like can be removed to largely improve the economical efficiency.

Also, the optical fiber code holding structure 1 is configured such that the light shielding device 41 is not rotated.

Due to such configuration, it is not necessary to insert the optical connector 22 into the connection hole while rotating the optical shutter 105 when connecting the optical connector 22 to the optical adapter 3. Thus, it is possible to solve the problem that the connecting work of the optical fiber 2 must be carefully carried out. Hence, it is possible to easily carry out the connecting work of the optical connector 22.

Also, since the light shielding device 41 is not rotated, it is possible to further simplify the structure of the optical fiber code holding member 4. As compared with the above-mentioned conventional technique, for example, the pusher for pushing the optical shutter 105 against the side of the connection hole and the like can be removed to further improve the economical efficiency.

The optical fiber code holding member 4 is usually fixed to the optical adapter 3 by using a fixing method such as a screw, adhesion, integral molding and the like. Then, the light shielding device 41 shields the output lights emitted from the connected connector 3.

Here, the output lights are emitted to the external space from the connection hole of the connected connector 3, and surely shielded by the light shielding device 41.

In short, since it is configured such that the light shielding device 41 is not rotated, the structure of the light shielding device 41 is simplified, and the troubles such as a rotation defect and the like are not induced. Thus, it is possible to improve the reliability of the light shielding property.

By the way, in the optical fiber code holding structure 1 in this embodiment, when the optical connector 22 is not connected to the connected connector 3, the output lights emitted from the connection hole of the optical adapter 3 are firstly emitted to the external space and then shielded.

In short, it is also necessary to consider how to shield the output light having the high energy density.

The test and the research are carried out in order to obtain the excellent manner for the light shielding. Consequently, the optical fiber code holding structure is preferably configured such that the light shielding device 41 is flat and the light shielding device 41 is vertical to the optical axis of the optical adapter 3.

Such configuration causes the output lights emitted from the optical adapter 3 to be reflected towards the connection hole of the optical adapter 3 by the light shielding device 41. That is, the reflection lights are not reflected towards the external space except the space sandwiched between the connection hole and the light shielding device 41. Thus, it is possible to eliminate the risk that the light having the high energy density is directly viewed.

By the way, when the light shielding device 41 diffusedly reflects the output lights, it is naturally allowable that the light shielding device 41 is not flat and the light shielding device 41 is not vertical to the optical axis of the optical adapter 3.

Also, preferably, the optical fiber code holding structure 1 is configured such that a distance from the optical adapter 3 to the light shielding device 41 is 5 to 20 cm.

Such configuration enables the optical connector 22 to be easily inserted into the optical adapter 3. Moreover, it is possible to effectively protect the output lights emitted from the optical adapter 3 and the reflection lights from the light shielding device 41 from being directly viewed.

This reason is as follows. That is, since the distance from the optical adapter 3 to the light shielding device 41 is equal to or longer than 5 cm, the optical connector 22 can be easily inserted into the insertion hole of the optical adapter 3. Also, since the distance is equal to or shorter than 20 cm, it is possible to reduce the risk that the output lights emitted from the optical adapter 3 are directly viewed.

Also, preferably, the optical fiber code holding structure 1 is configured such that the light shielding device 41 diffusedly reflects the output lights emitted from the connected connector 3. In short, the light shielding device 41 is desired to be at the condition of frosted surface rather than the condition of glossy surface.

Due to such configuration, the output lights emitted from the optical adapter 3 are diffusedly reflected when they are emitted to the light shielding device 41. This diffusion brings about the drop in the energy density. Thus, even if the reflection light is inputted to an eye, it is possible to eliminate the risk of the damage to the eye.

By the way, as the material for the light shielding device 41, it usually uses the material having the light shielding property, for example, metal, opaque resin, rubber and the complex material composed of them.

Also, the size of the light shielding device 41 is determined to be the size at which the lights can be surely shielded, by considering the emission area of the output lights emitted from the connected connector 3, the positional deviation of the optical axis of the output lights and the like.

Figure 4A:
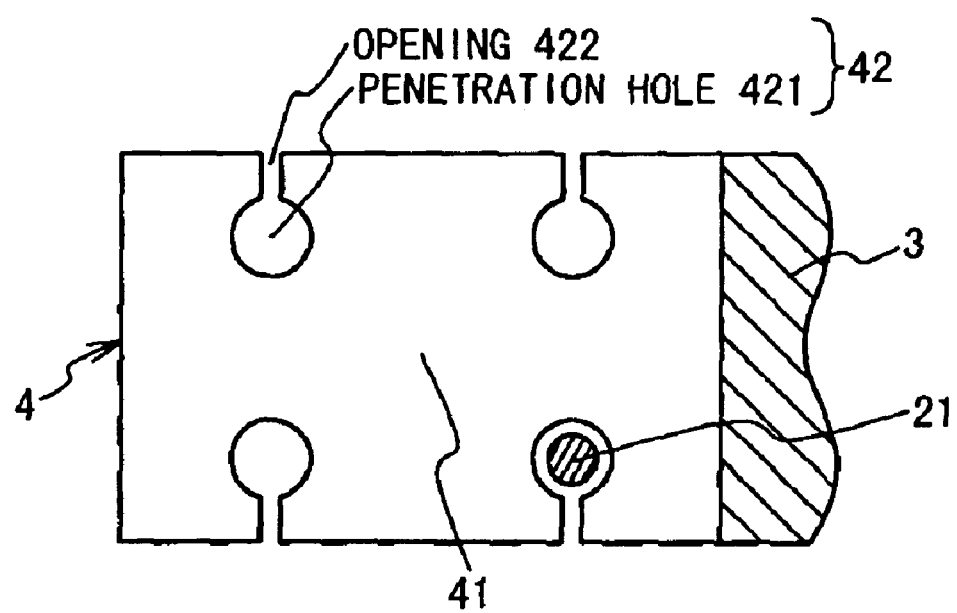
FIG. 4A shows a sectional view taken on a line A—A of FIG. 3, in a schematic view of a main portion to describe an optical fiber code holding member in the optical fiber code holding structure according to the present invention.

As shown in FIG. 4A, the optical fiber code holding structure 1 is preferably configured such that the holder 42 is provided with: a penetration hole 421 larger than the sectional shape of the optical fiber code 21; and an opening 422, through which the optical fiber code 21 is inserted into the penetration hole 421 from the side direction of the optical fiber code 21, for avoiding the inserted optical fiber code 21 from being easily disconnected.

Such configuration enables the optical fiber code 21 to be inserted into the opening 422 from the side direction, and thereby enables the optical fiber code 21 to be easily held.

Moreover, the held optical fiber code 21 does not receive the pushed pressure from the side of the penetration hole 421. Thus, it is possible to protect the optical fiber code 21 from being deformed or damaged.

Here, the dimension of the opening 422 is defined such that an open width is shorter than a diameter of the optical fiber code 21, and the optical fiber code 21 can be inserted by the elastic deformation on both sides of the opening 422 or the optical fiber code 21.

This reason is as follows. That is, since the optical fiber code 21 has the insertable dimension, the insertion and the separation can be done to hold the optical fiber code 21. Moreover, since the open width is shorter than the diameter of the optical fiber code 21, the inserted optical fiber code 21 is fastened. Thus, it is possible to protect the trouble that the optical fiber code 21 held in the penetration hole 421 is easily removed.

Figure 4B:
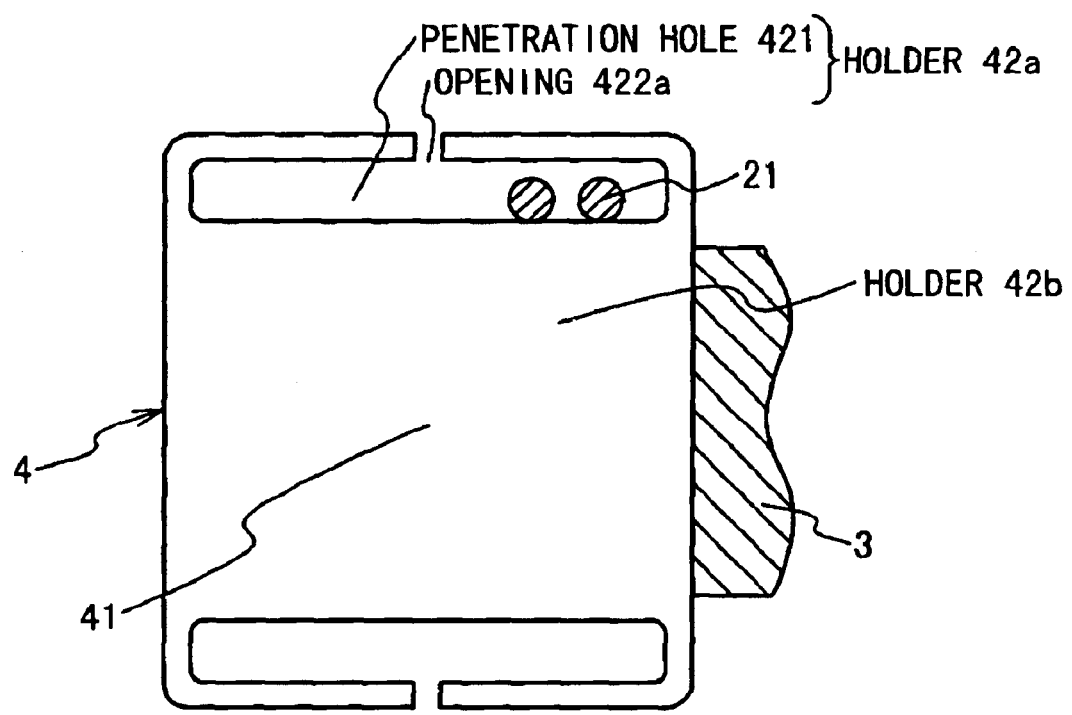
FIG. 4B shows a top view in a first application of the optical fiber code holding member.

The structure of the holder is not limited to the above-mentioned structure. For example, as shown in FIG. 4B, a holder 42*a* may be provided with: a penetration hole 421*a* formed at a size under which a plurality of optical fiber codes 21 can be held; and an opening 422*a*.

Due to such configuration, the plurality of optical fiber codes 21 can be held to effectively hold the optical fiber code 21.

Figure 4C:
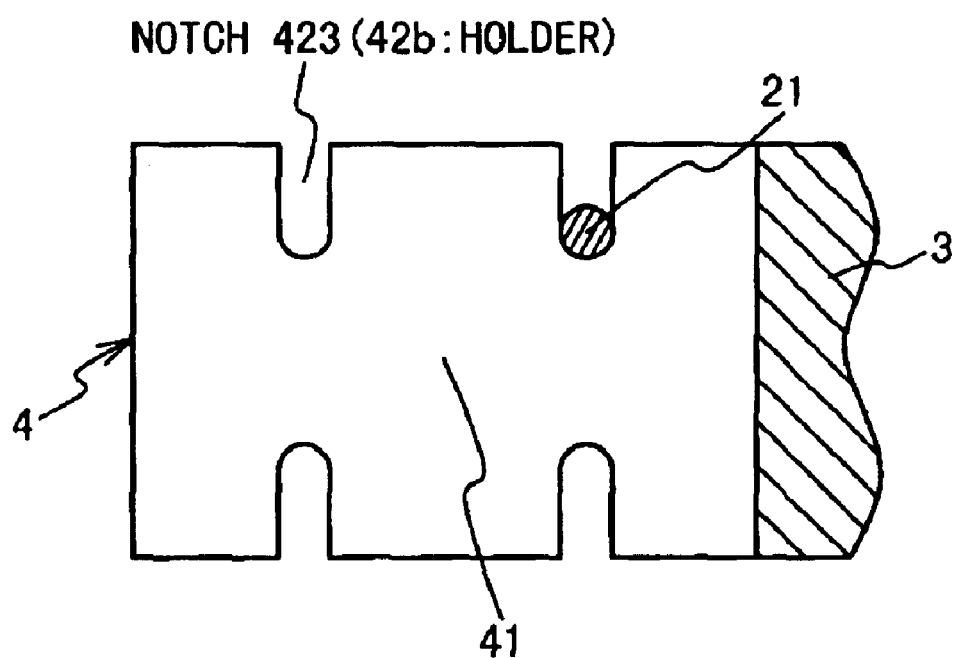
FIG. 4C shows a top view in a second application of the optical fiber code holding member.

Moreover, as shown in FIG. 4C, a holder 42*b* may be configured as a notch 423 for holding the optical fiber code 21 with it between.

Also, the optical fiber code 21 can be held in the notch 423 by determining the dimension of the width of the notch 423 so as to generate the contact pressure suited for sandwiching the optical fiber code 21 between.

Such configuration enables the holder 42*b* to be simple in shape. Thus, it is possible to drop the manufacturing cost of the optical fiber code holding member.

Here, the optical fiber code holding structure 1 is preferably configured such that the material of the holder (the material of the members constituting the holder) is elastic.

Such configuration enables the optical fiber code 21 to be held in the notch 423 at a moderate contact pressure by using that elastic force. Even if the optical fiber code 21 and the notch 423 are in contact with each other, it is possible to reduce the risk that the optical fiber code 21 is damaged.

By the way, the optical fiber code holding structure 1 may be configured such that a plurality of holders 42, 42*a* and 42*b* are formed.

Such configuration enables the optical fiber code 21 to be effectively held even if there are a plurality of optical fiber codes 21 to be held or there are a plurality of positions at which they are held.

As mentioned above, in the optical fiber code holding structure according to the first embodiment, the optical fiber code holding member 4 is configured such that the light shielding device 41 can carry out the function of protecting the light from being directly viewed, and the holder 42 can hold the optical fiber code 21.

Thus, in the optical fiber code holding structure 1, it is possible to drop the number of the parts necessary for the function of protecting the light from being directly viewed and the function of holding the optical fiber code and also simplify the structure. Thus, it is possible to improve the economical efficiency and easily carry out the connecting work of the optical connector 22.

[Second Embodiment of Optical Fiber Code Holding Structure]

A second embodiment of an optical fiber code holding structure according to the present invention will be described below with reference to FIG. 5.

Figure 5:
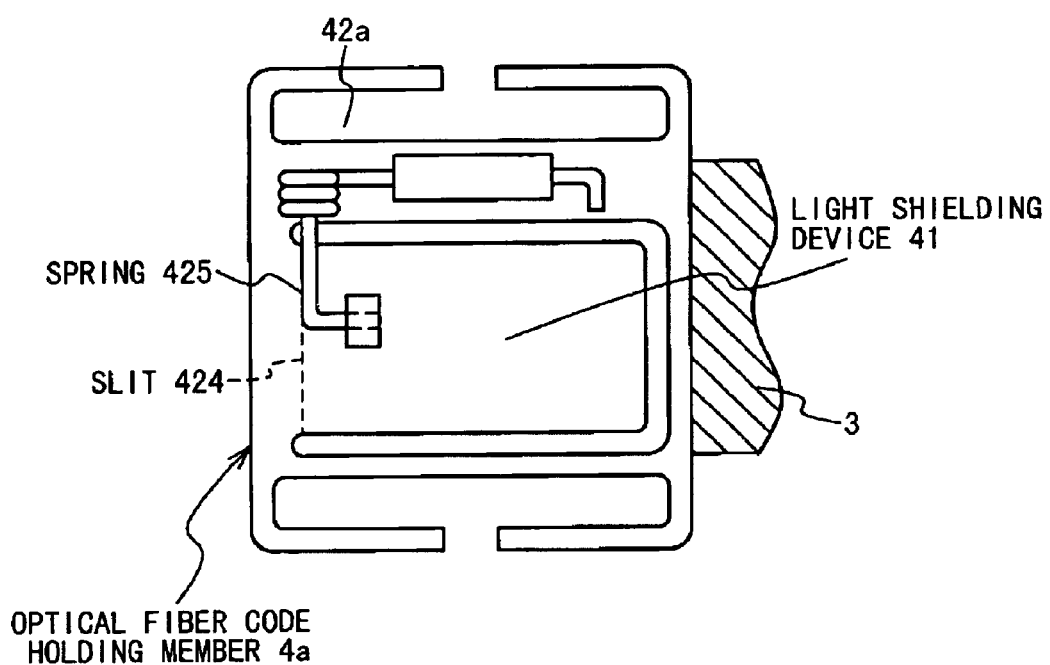
FIG. 5 shows a schematic top view of an optical fiber code holding member to describe a second embodiment of the optical fiber code holding structure according to the present invention.

FIG. 5 shows a schematic top view of an optical fiber code holding member to describe the second embodiment of the optical fiber code holding structure according to the present invention.

In FIG. 5, the optical fiber code holding structure in this embodiment is configured such that a light shielding device 41*a* of an optical fiber code holding member 4*a* is rotated.

The optical fiber code holding member 4*a* is composed of a square light shielding device 41*a* rotatably placed on an upper portion; holders 42*a* formed on both sides of the light shielding device 41*a*; and a spring 425 for pushing the light shielding device 41*a* to the same flat plane position as the holder 42*a*.

Also, the optical fiber code holding structure in this embodiment is configured such that the light shielding device 41*a* has the shape of the flat plate, and the light shielding device 41*a* and the holder 42*a* are integrated into the single structure.

Such configuration enables the optical fiber code holding member 4*a* to be installed near the connection hole of the connected connector 3. Thus, it is possible to shorten the distance at which the output lights are emitted to the external space.

By the way, this distance can be made closer to the side of the connected connector 3, in the range without any obstacle to the rotation of the light shielding device 41*a*.

Also, the light shielding device 41*a* is separated from the optical fiber code holding member 4 except one side opposite to one side on the connected connector 3, and it is configured so as to be upwardly rotated with the one side as a fulcrum. So, a V-shaped slit is formed on the rear of the one side so that the rotation is smoothly done.

The spring 425 is configured such that one end thereof is attached to the light shielding device 41*a*, the other end is attached to the portion on the side of the light shielding device 41*a* of the holder 42*a*, and the upwardly rotated light shielding device 41*a* is pushed so as to be returned to the same flat plane position as the holder 42*a*.

Due to such configuration, it is possible to easily carry out the operation for inserting and removing the optical fiber code 21. In short, when connecting the optical fiber code 21 to the connected connector 3, it is enough to make the optical connector 22 in contact with the light shielding device 41*a*, and then insert into the connection hole while rotating the light shielding device 41*a*. Or, when removing the optical fiber code 21, it is enough to disconnect the optical fiber code 21 from the connection hole.

Also, the light shielding device 41*a* and the spring 425 are at the conditions of the frosted surfaces, and the output lights are diffusedly reflected.

Thus, when the light shielding device 41 is rotated, even if the reflection light is reflected in the front direction (the direction opposite to the connected connector 3), there is no fear that the eye is damaged.

Also, the material of the optical fiber code holding member 4*a* is made of the synthetic resin. However, it is not limited to that material. For example, it can use metal, opaque resin, rubber and the complex material of them.

By the way, the other configurations and the actions are similar to those of the optical fiber code holding structure in the first embodiment.

Due to such configuration, in the optical fiber code holding structure in the second embodiment, the light shielding device 41 can be rotated to thereby place the optical fiber code holding member 4 closer to the side of the connected connector 3. Then, it is possible to further shorten the emission distance to the external space of the output lights.

By the way, as compared with the optical fiber code holding structure in the conventional technique, the shaft and the bearing for rotating the optical shutter 105 and the like can be removed to thereby improve the economic efficiency.

[Optical Fiber Code Holding Member]

The present invention is effective for the optical fiber code holding member.

In short, the optical fiber code holding member 4 (4a) described as the one configuration member in the above-mentioned optical fiber code holding structure is the optical fiber code holding member for holding the optical fiber code 21 connected to the optical adapter 3, and it is provided with: the light shielding device 41 (41a) for shielding the output lights emitted from the optical adapter 3; and the holder 42 (42a, 42b) for holding the optical fiber code 21.

Due to such configuration, the optical fiber code holding member can have the function of protecting the light from being directly viewed and the function of holding the optical fiber code. Thus, it is possible to increase the addition value.

Also, in the optical fiber code holding member, the number of the parts necessary for the function of protecting the light from being directed and the function of holding the optical fiber code can be dropped and the structure can be simplified to thereby improve the economical efficiency and easily carry out the connecting work of the optical connector.

By the way, the optical fiber code holding structure and the optical fiber code holding member of the present invention are not limited to the first and second embodiments of the above-mentioned optical fiber code holding structure and the embodiment of the optical fiber code holding member. Naturally, various variations can be carried out in the range without departing from the scope and the spirit of the present invention.

In the optical fiber code holding structure of the present invention, naturally, the optical fiber code holding structure in which the optical fiber code holding member has the shape of the flat plate and the light shielding device and the holder are integrated into the single structure, the optical fiber code holding structure in which the light shielding device is rotated, the optical fiber code holding structure in which the light shielding device is flat and the light shielding device is vertical to the optical axis, the optical fiber code holding structure in which the distance from the optical adapter to the light shielding device is 5 to 20 cm, the optical fiber code holding structure in which the light shielding device diffusedly reflects the output lights, the optical fiber code holding structure in which the holder is provided with the penetration hole and the opening linked to the penetration hole, the optical fiber code holding structure in which the holder is notched, the optical fiber code holding structure in which the holders are formed at the plurality of positions, and the optical fiber code holding structure in which the material of the holder is elastic can be respectively singly embodied, and it can be attained under the combination of them, and their effects can be given.

Also, it has been described as the optical fiber code holding structure. However, the present invention can naturally provide the similar effects even if it is used as the optical fiber code holding member.

As mentioned above, according to the optical fiber code holding structure and the optical fiber code holding member of the present invention, the function of protecting the light from being directly viewed is added to the optical fiber code holding member. Thus, the number of the parts necessary for the function of protecting the light from being directed and the function of holding the optical fiber code can be dropped and the structure can be simplified to thereby improve the economical efficiency and easily carry out the connecting work of the optical connector.

What is claimed is:

1. An optical fiber code holding structure, comprising:
   an optical adapter to which an optical connector of an optical fiber is connected, said optical connector being attached to an end of an optical fiber code of said optical fiber; and
   an optical fiber code holding member, and
   wherein said optical fiber code holding member has a light shielding device which shields light emitted from said optical adapter and a holding device which holds another optical fiber code.

2. The optical fiber code holding structure according to claim 1, wherein said optical fiber code holding member has a shape of a flat plate, and said light shielding device and said holding device are integrated into a single structure.

3. The optical fiber code holding structure according to claim 2, wherein a flat portion of said flat plate is used as said light shielding device.

4. The optical fiber code holding structure according to claim 3, wherein said flat portion of said light shielding device is vertical to an optical axis of said optical adapter.

5. The optical fiber code holding structure according to claim 3, wherein said flat portion of said light shielding device is vertical to an optical axis of said optical adapter such that the output light emitted from said optical adapter is reflected towards a connection hole of said optical adapter not to be reflected to an external space other than a space sandwiched between said connection hole and said light shielding device.

6. The optical fiber code holding structure according to claim 5, wherein said light shielding device diffusedly reflects said light emitted from said optical adapter.

7. The optical fiber code holding structure according to claim 5, wherein said holding device includes:
   a penetration hole larger than a sectional shape of said another optical fiber code; and
   an opening through which said another optical fiber code is inserted into said pentration hole.

8. The optical fiber code holding structure according to claim 3, wherein said light shielding device diffusedly reflects said light emitted from said optical adapter.

9. The optical fiber code holding structure according to claim 3, wherein said holding device includes:
   a penetration hole larger than a sectional shape of said another optical fiber code; and
   an opening through which said another optical fiber code is inserted into said penetration hole.

10. The optical fiber code holding structure according to claim 3, wherein said flat portion of said light shielding device is perpendicular to an optical axis of said optical adapter.

11. The optical fiber code holding structure according to claim 2, wherein said light shielding device is rotatable.

12. The optical fiber code holding structure according to claim 2, wherein said light shielding device diffusedly reflects said light emitted from said optical adapter.

13. The optical fiber code holding structure according to claim 2, wherein said holding device includes:
   a penetration hole larger than a sectional shape of said another optical fiber code; and
   an opening through which said another optical fiber code is inserted into said penetration hole.

14. The optical fiber code holding structure according to claim 1, wherein a distance from said optical adapter to said light shielding device is 5 to 20 cm.

15. The optical fiber code holding structure according to claim 1, wherein said light shielding device diffusedly reflects said light emitted from said optical adapter.

16. The optical fiber code holding structure according to claim 1, wherein said holding device includes:
   a penetration hole larger than a sectional shape of said another optical fiber code; and
   an opening through which said another optical fiber code is inserted into said penetration hole.

17. The optical fiber code holding structure according to claim 16, wherein said opening is formed to avoid said inserted optical fiber code being easily disconnected.

18. The optical fiber holding structure according to claim 1, wherein said holding device is notched to hold said optical fiber code.

19. The optical fiber code holding structure according to claim 1, wherein said optical fiber code holding member includes a plurality of said holding devices.

20. An optical fiber code holding structure according to claim 1, wherein said holding device is made of elastic material.

21. The optical fiber code holding structure according to claim 1, wherein said optical fiber code holding member is attached to said optical adapter.

22. The optical fiber code holding structure according to claim 1, wherein said optical fiber code holding member includes an upper face having at least one opening, said another optical fiber code being positioned to extend through said at least one opening.

23. The optical fiber code holding member, comprising:
   a holding device holding a first optical fiber code, the first optical fiber code being optically connected to a first optical adapter; and
   a light shielding device which shields light emitted from said first optical adapter, said light shielding device being fixed to a second optical adapter which is optically connected to a second optical fiber code.

24. The optical fiber code holding member according to claim 23,
   wherein said holding device includes an upper face having at least one opening, said first optical fiber code being positioned to extend through said at least one opening.

25. An optical fiber code holding structure, comprising: a first optical adapter to which an optical connector of an optical fiber is connected, said optical connector being attached to an end of a first optical fiber code of said optical fiber; and
   optical fiber code holding means, extended from said first optical adapter, for holding a second optical fiber code and shielding light from a second optical adapter.

26. An optical fiber code holding structure, comprising: an optical adapter to which an optical connector of an optical fiber is conected, said optical connector being attached to an end of an optical fiber code of said optical fiber; and
   an optical fiber code holding member, and
   wherein said optical fiber code holding member has a light shielding device which shields light emitted from said optical adapter and a holding device holding said optical fiber code,
   wherein said optical fiber code holding member has a shape of a flat plate, and said light shielding device and said holding device are integrated into a single structure.

27. An optical fiber code holding structure, comprising:
   an optical adapter to which an optical connector of an optical fiber is connected, said optical connector being attached to an end of an optical fiber code of said optical fiber; and
   an optical fiber code holding member, and
   wherein said optical fiber code holding member has a light shielding device which shields light emitted from said optical adapter and a holding device holding said optical fiber code, and wherein said holding device is notched to hold said optical fiber code.

28. An optical fiber code holding structure, comprising:
   an optical adapter to which an optical connector of an optical fiber is connected, said optical connector being attached to an end of an optical fiber code of said optical fiber; and
   an optical fiber code holding member, and
   wherein said optical fiber code holding member has a light shielding device which shields light emitted from said optical adapter and a holding said optical fiber code, and wherein said optical fiber code holding member includes a plurality of said holding devices.

* * * * *